United States Patent
Hoover et al.

(10) Patent No.: US 8,108,851 B2
(45) Date of Patent: Jan. 31, 2012

(54) EXTERNAL REGISTRATION FOR FUNCTION CONFIGURATION WITHIN A CLIENT PLATFORM APPLICATION

(75) Inventors: Adam M. Hoover, Wake Forest, NC (US); Gregg W. Miller, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 1768 days.

(21) Appl. No.: 11/343,140

(22) Filed: Jan. 30, 2006

(65) Prior Publication Data

US 2007/0180444 A1    Aug. 2, 2007

(51) Int. Cl.
*G06F 9/44* (2006.01)
(52) U.S. Cl. .......................... 717/168; 717/172; 717/177
(58) Field of Classification Search .................. None
See application file for complete search history.

(56) References Cited

U.S. PATENT DOCUMENTS

| | | | |
|---|---|---|---|
| 5,694,601 A | 12/1997 | White | 718/101 |
| 5,734,831 A | 3/1998 | Sanders | 709/223 |
| 5,940,395 A | 8/1999 | Fraenkel et al. | 370/401 |
| 6,141,686 A | 10/2000 | Jackowski et al. | |
| 6,212,575 B1 | 4/2001 | Cleron et al. | 719/328 |
| 6,434,744 B1 | 8/2002 | Chamberlain et al. | |
| 6,487,547 B1 | 11/2002 | Ellison et al. | 707/2 |
| 6,578,042 B2 | 6/2003 | Arrouye et al. | 707/102 |
| 6,782,412 B2 | 8/2004 | Brophy et al. | 709/204 |
| 6,826,571 B1 | 11/2004 | Baer et al. | 707/10 |
| 6,857,124 B1 | 2/2005 | Doyle | 719/316 |
| 6,871,345 B1 * | 3/2005 | Crow et al. | 717/175 |
| 6,874,143 B1 * | 3/2005 | Murray et al. | 717/173 |
| 6,948,164 B2 * | 9/2005 | Tinker | 717/168 |
| 2003/0022663 A1 | 1/2003 | Rajaram et al. | |
| 2003/0023964 A1 | 1/2003 | Rajaram et al. | |
| 2005/0060698 A1 * | 3/2005 | Boykin et al. | 717/166 |
| 2005/0149712 A1 * | 7/2005 | Martinez et al. | 713/1 |
| 2005/0268280 A1 * | 12/2005 | Fildebrandt | 717/113 |

(Continued)

FOREIGN PATENT DOCUMENTS

EP    1463269    9/2004

OTHER PUBLICATIONS

R. Chatley et al. MagicBeans: a platform for deploying plugin components. In W. Emmerich and A. L. Wolf, editors, Proc. of the Second Int. Working Conf. on Component Development, vol. 3083 of LNCS, pp. 97-112, May 2004. Retrieved on Mar. 15, 2010. Retrieved from the Internet:URL<http://pubs.doc.ic.ac.uk/MagicBeans/MagicBeans.pdf.*

(Continued)

*Primary Examiner* — Thuy Dao
*Assistant Examiner* — Cheneca Smith
(74) *Attorney, Agent, or Firm* — Steven L. Nichols; Van Cott, Bagley, Cornwall & McCarthy P.C.

(57) ABSTRACT

A method, system and computer program and method for modifying functionality of a computer program. In one embodiment, configuration files include configuration directives for removing and replacing computer executable codes. The configuration directives include code identifiers pointing to the computer executable codes for execution by the computer program. A lookup module is configured to recursively search for configuration files within plug-in packages. A control module is configured to modify the program flow of the computer program in accordance with the configuration directives.

14 Claims, 6 Drawing Sheets

U.S. PATENT DOCUMENTS

2005/0289535 A1* 12/2005 Murray et al. ................. 717/172
2006/0026591 A1* 2/2006 Backhouse et al. ............ 717/177
2006/0271925 A1* 11/2006 Schuelein et al. ............. 717/168
2006/0277537 A1* 12/2006 Chan et al. .................... 717/168

OTHER PUBLICATIONS

Oreizy et al, Decentralized Software Evolution, Institute of Software Research, Sep. 2003, Retrieved on [Sep. 22, 2011] Retrieved from the Internet:URL<http://citeseerx.ist.psu.edu/viewdoc/download?doi=10.1.1.59.30&rep=rep1&type=pdf>.*

Chatley et al,Predictable Dynamic Plugin Systems, Fundamental Approaches to Software Engineering, LNCS 2004, pp. 129-143, Retrieved on [Sep. 22, 2011] Retrieved from the Internet:URL<http://citeseerx.ist.psu.edu/viewdoc/download?doi=10.1.1.137.3509&rep=rep1&type=pdf>.*

Notification of Transmittal of the International Search Report and Written Opinion of the International Searching Authority, or the Declaration, PCT Patent Application Serial No. PCT/EP2007/050249 (Sep. 5, 2007).

"Safe Mechanism for Installing Operating System Updates with Applications", IBM Technical Disclosure Bulletin, vol. 41, No. 01, pp. 557-559 (Jan. 1998).

Safe Mechanism for Installing Operating System Updates with Applications, IBM Technical Disclosure Bulletin, vol. 41, No. 01, XP-000772211, pp. 557-559 (Jan. 1998).

* cited by examiner

EXTERNAL REGISTRATION FOR FUNCTION CONFIGURATION WITHIN A CLIENT PLATFORM APPLICATION

FIELD OF THE INVENTION

The present invention relates generally to computers, computer programs and methods therefore, and more specifically to modifying functionality of a computer program by connecting external units of computer code, referred to as plug-ins.

BACKGROUND

The Eclipse platform (also referred to herein as "Eclipse") is a computer program that provides a highly extensible computing environment. Eclipse is typically employed as an Integrated Development Environment (IDE). An IDE is a computer program product that helps computer programmers develop other computer programs. The use of an IDE generally enables programs to be developed more quickly, with fewer errors and at a lower cost. The Eclipse platform was designed to be as generic and extensible as possible to facilitate its use in developing programs in a wide variety of programming languages. This extensible nature, as well as specific functionality such as user interface functionality provided by Eclipse, has encouraged programmers to use Eclipse as the basis of applications never envisioned by the original developers.

Present versions of Eclipse execute within the Java Virtual Machine (JVM) runtime environment. Pre-defined functionality, called libraries, to perform a wide variety of tasks is often made available to the JVM. Historically, it has been necessary to design a separate version of a computer program product for each type of computer and operating system on which it is to be run. The JVM addresses this limitation by allowing programs written in Java to run on any computer or operating system with little to no modification. Therefore, Eclipse can run on most if not all computer systems which support the Java platform.

At its core, the Eclipse platform provides minimal functionality to its user. The platform provides various frameworks and significant user interface capabilities, but it generally does not provide specific implementations of anything. In fact, the Eclipse platform itself does not know how to process any specific computer language. Most functionality offered by Eclipse-based applications is provided via a technological device known as a "plug-in." A plug-in is a unit of computer code which provides specific, well-defined functionality. A plug-in may also specify configuration settings. It is even possible for a plug-in to contain configuration settings but no program logic. The reasons for doing so are discussed below. Each plug-in typically has a unique identifier which distinguishes it from any other Eclipse plug-in.

The manner in which a plug-in relates to the remainder of an Eclipse-based application is defined in a special file called a manifest. The manifest specifies the unique identifier as discussed above. It also specifies the location of the actual computer code for the plug-in. The manifest is typically a text file in Extensible Markup Language (XML) format. XML is a technology which provides a basic structure applicable to various types of data. Within this basic structure, a technological device referred to as a "schema" may be used to define rules of syntax for more specific types of data. Unlike files produced by word processors and other common data entry applications, XML files often require a high degree of technical skill to edit due to the precise nature of the file format.

Plug-ins connect to each other in a hierarchical fashion. Indeed, an Eclipse-based application is structured as a hierarchical tree of plug-ins, all directly or indirectly linked to the Eclipse platform itself. To allow plug-ins to connect to each other, each plug-in may define one or more "extension-points." An extension-point is a specification that one or more plug-ins, each referred to as an "extension", may connect to the original plug-in. The extension-point also defines the interface, which is the exact manner in which the extensions connect to and communicate with the original plug-in. The purpose in connecting an extension to a plug-in is to allow the extension to contribute its own functionality and configuration settings to the original plug-in's functionality. Notably, the Eclipse platform does not require any given extension-point to have an extension connected to it.

The connections between extension-points and extensions are defined in the plug-in manifest files discussed above. However, once an extension has been connected to an extension-point by the plug-in manifests, the Eclipse platform does not define a method to remove that extension or replace it with a different extension.

SUMMARY OF THE INVENTION

The present invention addresses the above-mentioned limitation of the prior art by introducing a technique for replacing an extension with a different extension. The technique also allows removing an existing extension.

Thus, one exemplary aspect of the present invention is a method for modifying the functionality of a computer program. The method includes a receiving operation for inputting a first plug-in package. The first plug-in package contains a first code identifier, and the first code identifier points to a first computer executable code for execution by the computer program. Another receiving operation receives a second plug-in package. The second plug-in package includes a configuration directive for removing or replacing the first computer executable code. To identify the first computer executable code, the configuration directive includes the first code identifier. A modifying operation alters the program flow of the computer program in accordance with the configuration directive.

In one embodiment of the method, a loading operation loads the configuration directive from a file within the second plug-in package. When replacing the first computer code, the method may include a replacing operation that replaces the first computer executable code with a second computer executable code. Furthermore, the configuration directive contains a second code identifier pointing to the second computer executable code. When removing the first computer code, a removing operation removes the first computer executable code and the configuration directive includes a null value. The method may include creating a key-value entry in a key-value listing, with the key-value entry including the first code identifier.

Another exemplary aspect of the present invention is a system for modifying the functionality of a computer program. The system includes a lookup module configured to recursively search for configuration files within plug-in packages. The configuration files are composed of configuration directives for removing and/or replacing computer executable codes, and the configuration directives include code identifiers pointing to the computer executable codes for execution by the computer program. A control module is configured to modify program flow of the computer program in accordance with the configuration directives.

Yet a further exemplary aspect of the invention is a computer program product for modifying the functionality of a computer application. The computer program product includes computer readable program codes configured to receive a first plug-in package and a second plug-in package. The first plug-in package includes a first code identifier pointing to a first computer executable code for execution by the computer application. The second plug-in package includes a configuration directive for removing and/or replacing the first computer executable code, as well as the first code identifier. The computer program product also includes code to modify program flow of the computer application in accordance with the configuration directive.

The foregoing and other features, utilities and advantages of the invention will be apparent from the following more particular description of various embodiments of the invention as illustrated in the accompanying drawings.

DETAILED DESCRIPTION OF THE INVENTION

Figure 1A:
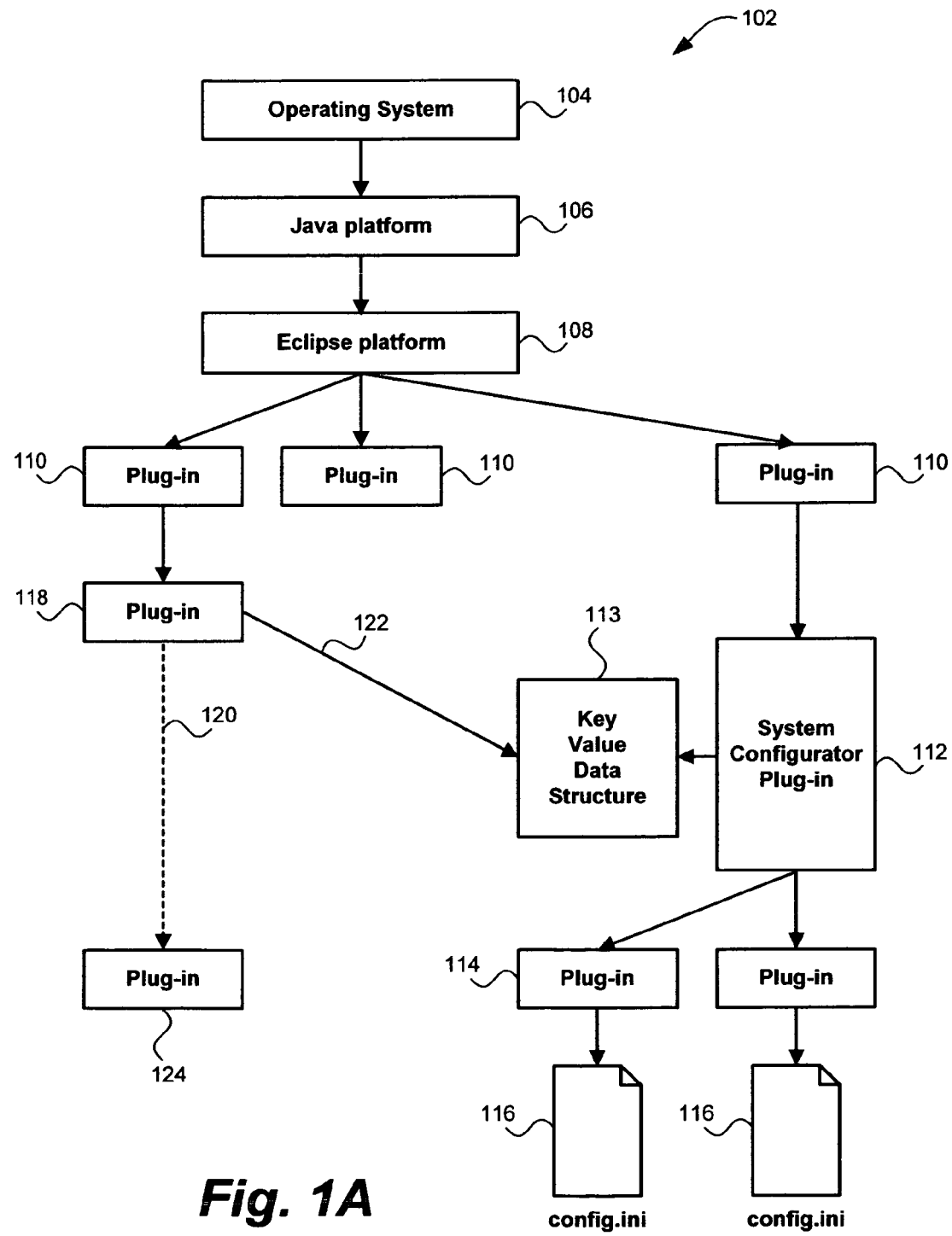
FIG. 1A shows one configuration of an exemplary environment embodying the present invention. It also illustrates the behavior of the exemplary environment where an extension being used is not replaced or removed.

The following description details how the present invention is employed to allow plug-ins to be replaced with other plug-ins or removed entirely in an existing plug-in based application. Throughout the description of the invention reference is made to FIGS. 1-4. When referring to the figures, like structures and elements shown throughout are indicated with like reference numerals.

The invention includes a technological device called the system configurator. The system configurator manages the replacement and removal of plug-ins. It acts as a layer between the plug-in functionality and the association of plug-ins to extension-points.

FIG. 1 shows an exemplary environment 102 embodying the present invention. Environment 102 demonstrates the overall structure of the invention and the relation of the system configurator within it. It is initially noted that the environment 102 is presented for illustration purposes only, and is representative of countless configurations in which the invention may be implemented. Thus, the present invention should not be construed as limited to the environment configurations shown and discussed herein.

The environment 102 includes an operating system 104. A Java platform 106 runs on top of the operating system 104. Utilizing the Java platform 106 is an Eclipse platform 108. Plug-ins 110 provide most of the Eclipse environment's actual functionality. They connect hierarchically to the Eclipse platform 108 and to each other 110.

In one embodiment of the invention, the system configurator 112 is itself a plug-in. Specifically, the system configurator 112 is a special plug-in which specifies how other plug-ins connect to each other. One or more configuration files 116 specify plug-ins to be replaced and removed. Generally, for each configuration file 116, a plug-in 114 exists and contains a parameter specifying the precise location of the configuration file 116 within a storage medium. Each such plug-in 114 connects to an extension-point of the system configurator 112 provided for this purpose. Additional details about the configuration files 116 are provided below.

The system configurator 112, after reading all configuration files 116, stores the association of plug-ins with their replacement plug-ins in a key-value data structure 113. This process is explained in detail below. In a particular embodiment of the present invention, this key-value structure 113 is stored within the system properties provided by the Java platform. The system properties functionality is a standard feature of the Java environment allowing data pertaining to the system state to be stored in a key-value structure. Java offers predefined methods to query the system properties. For example, the java.util.Properties application programming interface (API) provided in Sun Microsystems' J2SE 1.5 platform may be employed by the present invention. Each plug-in may utilize these methods in order to query for the unique identifier of an extension to determine whether it is to be replaced by another extension or removed.

In a particular embodiment of the present invention, the system configurator 112 offers a function call which accepts as input the unique identifier of a plug-in. If the specified plug-in is to be replaced by a different plug-in, the function returns as output the unique identifier of that plug-in. If the specified plug-in is to be removed, a special value is returned as output indicating that no plug-in exists. It is contemplated that this value is "null", a special value in Java and other programming languages indicating the absence of a specific value. If the specified plug-in is neither replaced nor removed, its unique identifier will be returned as output to indicate that it indeed should be used.

A plug-in 118 which wishes to utilize an extension first queries the key-value structure 113. (The extension is itself a plug-in. For simplicity, the immediate discussion refers to the first plug-in as simply the "plug-in" and the second plug-in which extends the first plug-in as the "extension.") The key which is queried is the unique identifier of the extension as specified by the underlying technology. If the key-value structure 113 contains a value corresponding to this key, the plug-in 118 acts as specified by the returned value. If this value is the unique identifier of a different extension, the plug-in 118 utilizes this extension instead of the original extension. Alternatively, the value corresponding to this key may be a special value indicating that no plug-in exists. For example, the value of the key-value pair may be set to "null", a special value in Java and other programming languages indicating the absence of a specific value. In this case, the plug-in 118 acts as if no extension is present. If the key-value structure 113 does not contain a value corresponding to the key, the plug-in 118 utilizes the original extension.

The system configurator, in one embodiment, uses the unique identifiers of the plug-ins themselves, not of the extension-points. An extension-point may have multiple extensions which differ from each other and therefore have different unique identifiers. By using the unique identifiers of the plug-ins themselves, the configurator can replace or remove one of the extensions without impacting the other extensions at the extension-point.

There are three general cases for how the key-value structure 113 may be used to match the plug-in to the appropriate extension. The first case is where the extension's unique identifier is not specified in any configuration file 116. FIG. 1A depicts this case, with plug-in 118 as the plug-in being extended. The dotted line 120 indicates that in the underlying technology, plug-in 118 is extended by plug-in 124. This association is correct in actuality, because, as discussed below, nothing has superseded it. However, plug-in 118 does not rely on the underlying technology. Instead, the configurator 112 queries the key-value structure 113, using the unique identifier of the extension, plug-in 124, as the key. This query is depicted by the solid line 122. Because the extension's unique identifier was not specified in any configuration file 116, it is not present in the key-value structure 113. The query returns the fact that no value corresponds to the given key. As a result, plug-in 118 correctly utilizes plug-in 124 as its extension.

Figure 1B:
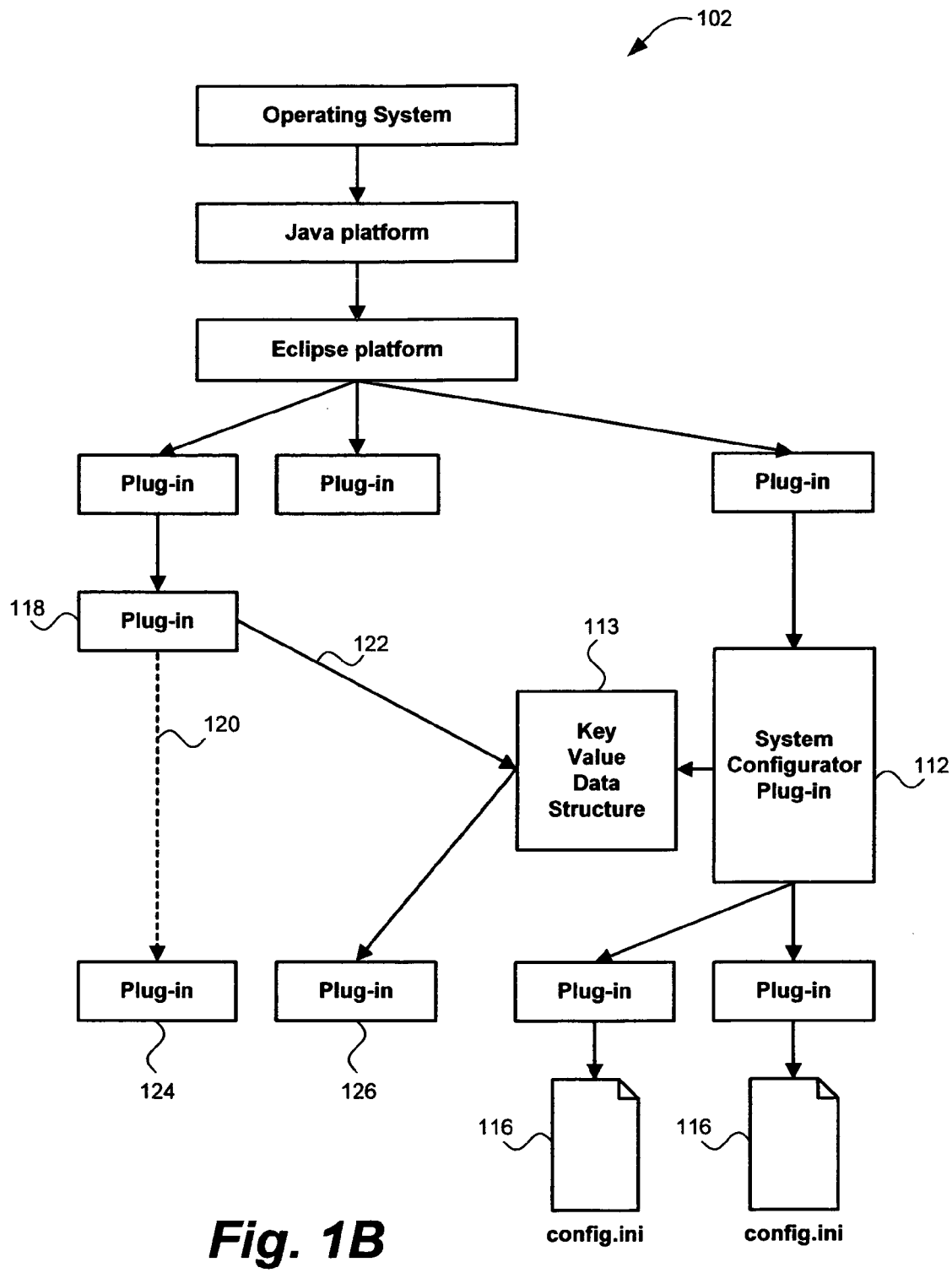
FIG. 1B illustrates the behavior of the exemplary environment where an extension is replaced by a different extension.

FIG. 1B depicts the second case where an extension is replaced as per a directive in a configuration file 116. Again, the dotted line 120 indicates that in the underlying technology, plug-in 118 is extended by plug-in 124. However, a configuration file 116 specifies that plug-in 124 is replaced by plug-in 126. Thus, the configuration file 116 supersedes the association in the underlying technology so that plug-in 118 is extended by plug-in 126. Replacing plug-in 124 with plug-in 126 is achieved by the system configurator 112 recursively searching the key-value structure 113, using the unique identifier of the extension for plug-in 124 as the key. This query is depicted by the solid line 122. The query returns the unique identifier of plug-in 126 as the corresponding value. As a result, plug-in 118 correctly utilizes plug-in 126 as its extension.

Figure 1C:
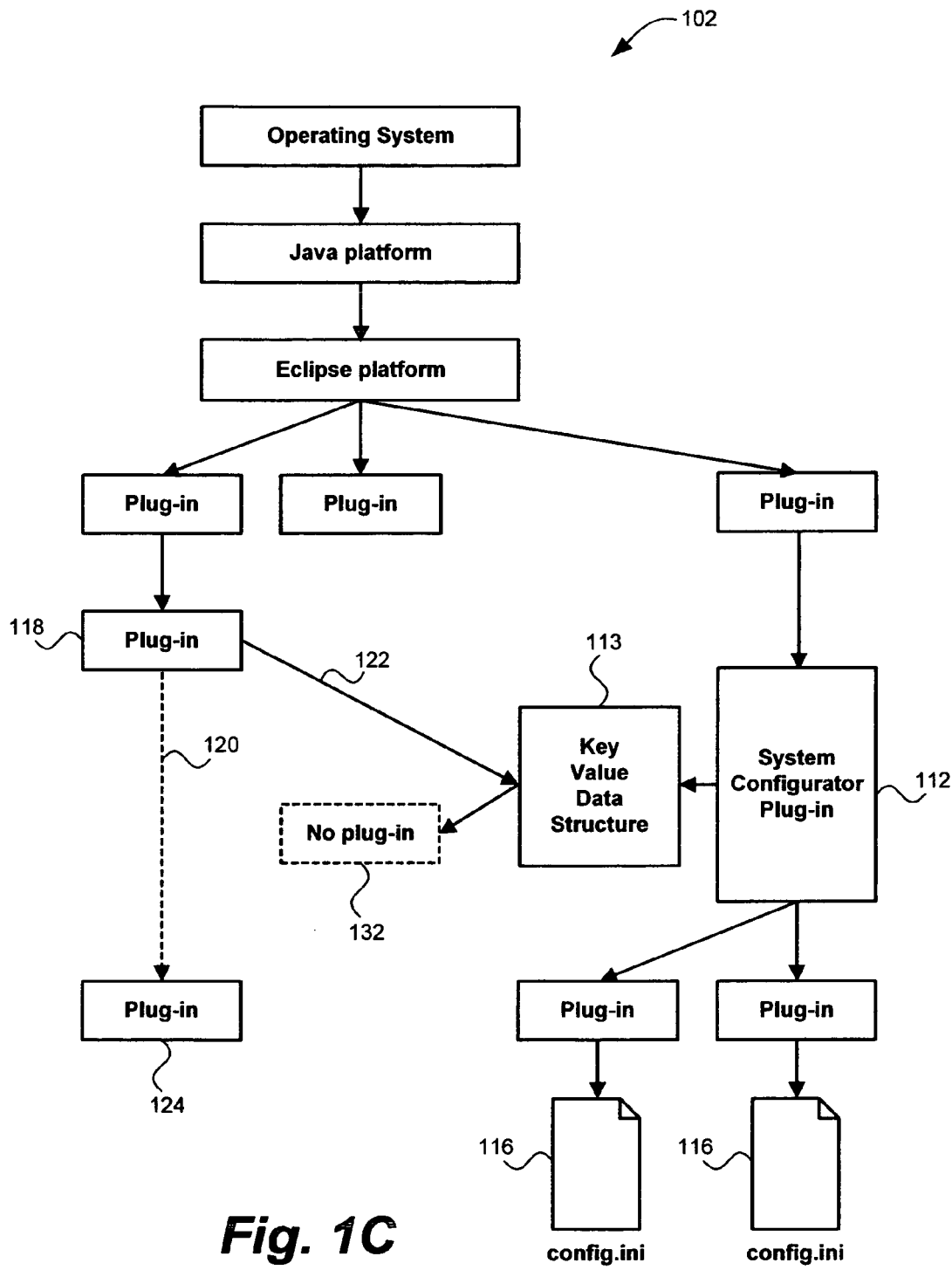
FIG. 1C illustrates the behavior of the exemplary environment where an extension is removed.

FIG. 1C depicts the third case contemplated by the invention wherein the plug-in at an extension-point is removed as per a directive in a configuration file 116. Again, the dotted line 120 indicates that in the underlying technology, plug-in 118 is extended by plug-in 124. However, a configuration file 116 specifies that plug-in 124 is removed. The configuration file 116 supersedes the association in the underlying technology, so plug-in 118 is in actuality no longer extended by plug-in 124 (it may be extended by other plug-ins, but any such extensions are not part of the present discussion). Removing plug-in 126 is achieved by the system configurator 112 recursively searching the key-value structure 113, using the unique identifier of the extension for plug-in 124 as the key. This query is depicted by the solid line 122. The query returns the special value 132 (i.e., null) indicating the lack of a plug-in. As a result, plug-in 118 correctly acts as if it is not extended by plug-in 124.

Figure 2:
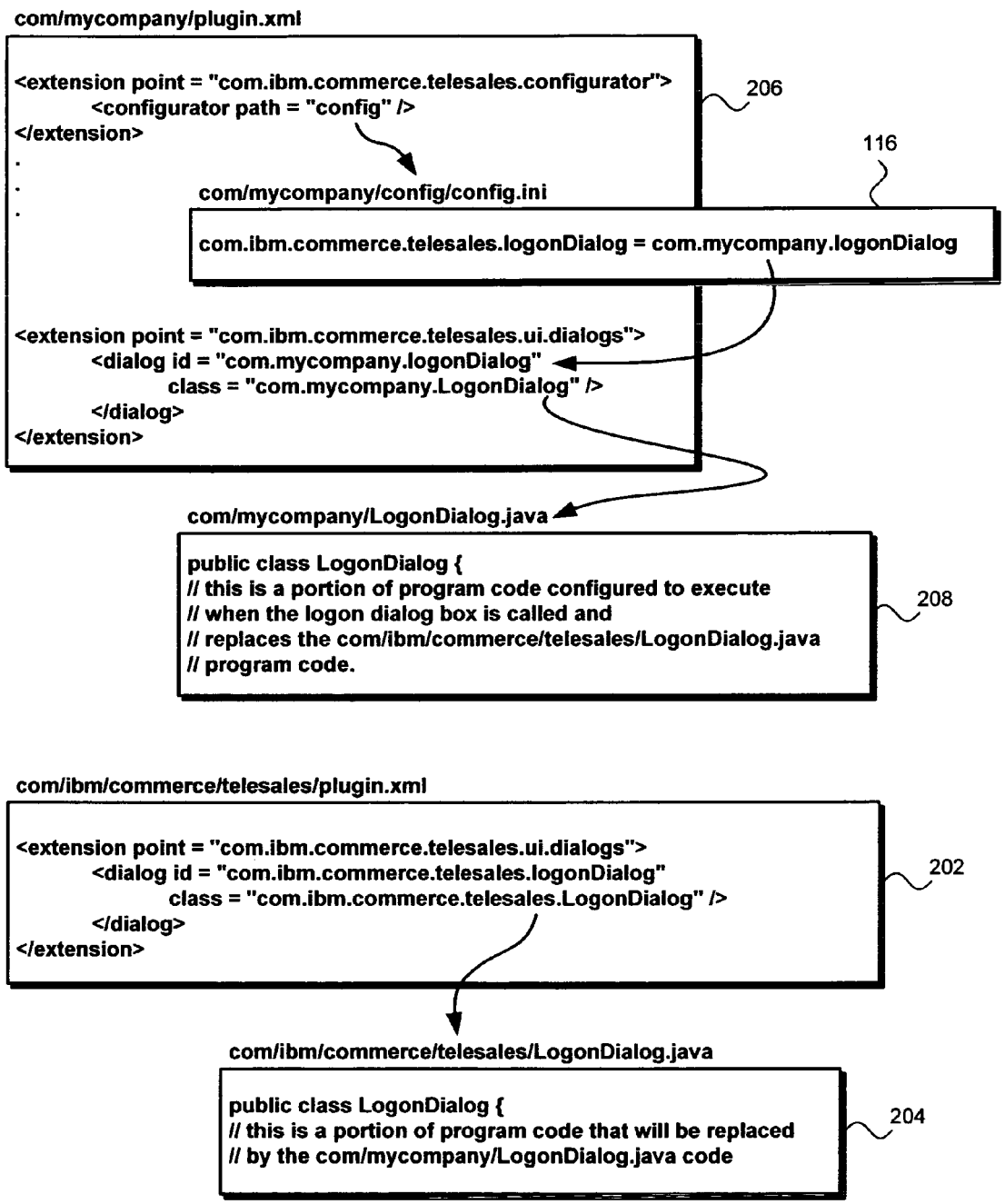
FIG. 2 graphically demonstrates the manner in which an embodiment of the present invention associates a plug-in with its extension. It also illustrates one format of the configuration files specifying the replacement or removal of plug-ins.

Turning now to FIG. 2, an example of how an embodiment of the present invention is used to replace a first logon dialog plug-in with a second logon dialog extension is demonstrated. This example utilizes Eclipse as the underlying plug-in technology. However, it is emphasized that alternate embodiments of the present invention designed for underlying plug-in technologies other than Eclipse will also behave as demonstrated herein.

In accordance with the example shown, the first logon dialog plug-in to be replaced includes a unique identifier com.ibm.commerce.telesales.logonDialog. The first logon dialog extends a parent plug-in at an extension point identified as com.ibm.commerce.telesales.ui.dialogs. The purpose of this first logon dialog plug-in is to provide a default dialog for users to log in or authenticate themselves to a computer program product. A plug-in manifest 202 defines the basic structure of the default dialog. The id attribute of the dialog element specifies the plug-in's unique identifier, com.ibm.commerce.telesales.logonDialog. The point attribute of the extension element specifies that the plug-in is connected to the com.ibm.commerce.telesales.ui.dialogs extension-point. The class attribute of the dialog element specifies that the actual computer code for the plug-in is located in the Java class com.ibm.commerce.telesales.logonDialog, whose source code is located in the file com/ibm/commerce/telesales/logonDialog.java 204.

The first plug-in is replaced by a second plug-in having the unique identifier com.mycompany.logonDialog. The purpose of this extension is to provide a customized authentication dialog which replaces the default authentication dialog. This extension also has its own plug-in manifest 206. In a particular embodiment of the present invention, the path attribute of the configurator element of the plug-in manifest specifies the location of the configuration file 116 within a storage medium. The attribute contains a path to a subdirectory which is relative to the base directory housing the plug-in. The configuration file 116 is located in this subdirectory and is named "config.ini". In the example shown, the relative path is "config" and the plug-in base directory is "com/mycompany". Therefore, the configuration file 116 is found at "com/mycompany/config/config.ini" on the storage medium.

The configuration file 116 contains machine-readable codes representing a key-value data structure. A key-value data structure associates members of one set of data, known as keys, with members of another set of data, known as values. Each key in the key-value data structure is uniquely associated with a value. The converse is not true, however; the same value may be associated with more than one key. A key-value data structure is also known as an associative array.

In the key-value data structure, the keys are the unique identifiers of the plug-ins which are to be reassigned. Two possibilities exist for the value associated with a particular key. If the value is the unique identifier of another plug-in, the plug-in specified in the key is to be replaced by the plug-in specified in the value. If the value is a special value indicating the lack of a plug-in, the plug-in specified by the key is to be removed. It is contemplated that this value may be "null", a special value in Java and other programming languages indicating the absence of a specific value. In a particular embodiment of the present invention, the configuration file 116 uses the file format specified by the java.util.Properties class of the Java platform. This file format represents a key-value data structure. Moreover, the java.util.Properties class provides program logic to read the file format from storage media to random access memory and to otherwise manipulate the file.

During program operation, the time interval required to determine the extension for a given plug-in may need to be as short as possible. In general, the time to access data from a storage medium is quite long. Therefore, it is contemplated that the contents of the configuration files 116 can be loaded into random access memory during initialization in order to minimize this time interval. Moreover, the system configurator can initialize an optimized data structure to further minimize this time interval. It is contemplated that a key-value data structure may be used here, just as it was for the configuration files 116 themselves. The key-value data structure, or associative array, is especially efficient and powerful when implemented in random access memory. Special techniques, such as hashing, may be utilized to minimize the time to find the associated value. It is possible to add a new key and its values to an associative array, edit the value for an existing key or remove a key and its value entirely. Thus, the key-value data structure is one ideal data structure for storing the configuration files in random access memory contemplated by the present invention.

More than one configuration file 116 may be specified. If this is the case, all the configuration files are combined into one key-value data structure in random access memory. It is contemplated that the configurator may sort this list, applying rules to handle error situations such as when a single plug-in is identified to be replaced with two conflicting plug-ins, or where a plug-in is identified to be both replaced and removed. For example, the configurator may associate priorities to various configuration files 116 to arbitrate conflicting replace/remove directives.

If a plug-in is not replaced or removed in any configuration file 116, it continues to exist and to be associated with other plug-ins as specified in the underlying technology. This is reflected in the key-value structure by the fact that the unique identifier of the unaffected plug-in is not a key in the structure.

The plug-in manifest 206 for the customized authentication dialog plug-in defines the basic structure of the customized dialog. The id attribute of the dialog element specifies the unique identifier, com.mycompany.logonDialog. The point attribute of the extension element specifies that the plug-in is designed to connect with the com.ibm.commerce.telesales.u-i.dialogs extension-point. Note that the extension-point of the replacement plug-in is identical to the extension-point of the plug-in being replaced. The class attribute of the dialog element specifies that the actual computer code for the plug-in is located in the Java class com.mycompany.logonDialog, whose source code is located in the file com/mycompany/logonDialog.java 208.

In the example above, wherever the plug-in with the unique identifier com.ibm.commerce.telesales.logonDialog was specified as the extension of another plug-in in the underlying technology, the plug-in with the unique identifier com.mycompany.logonDialog is used instead. As a result, the program logic specified in com/mycompany/logonDialog.java 208 powers any request for com.ibm.commerce.telesales.logonDialog. It is important to note that the once the plug-in has been replaced, the program logic of the first plug-in, including both the XML 202 and Java computer code 204, is not executed when requesting the plug-in com.ibm.commerce.telesales.logonDialog.

Figure 3:
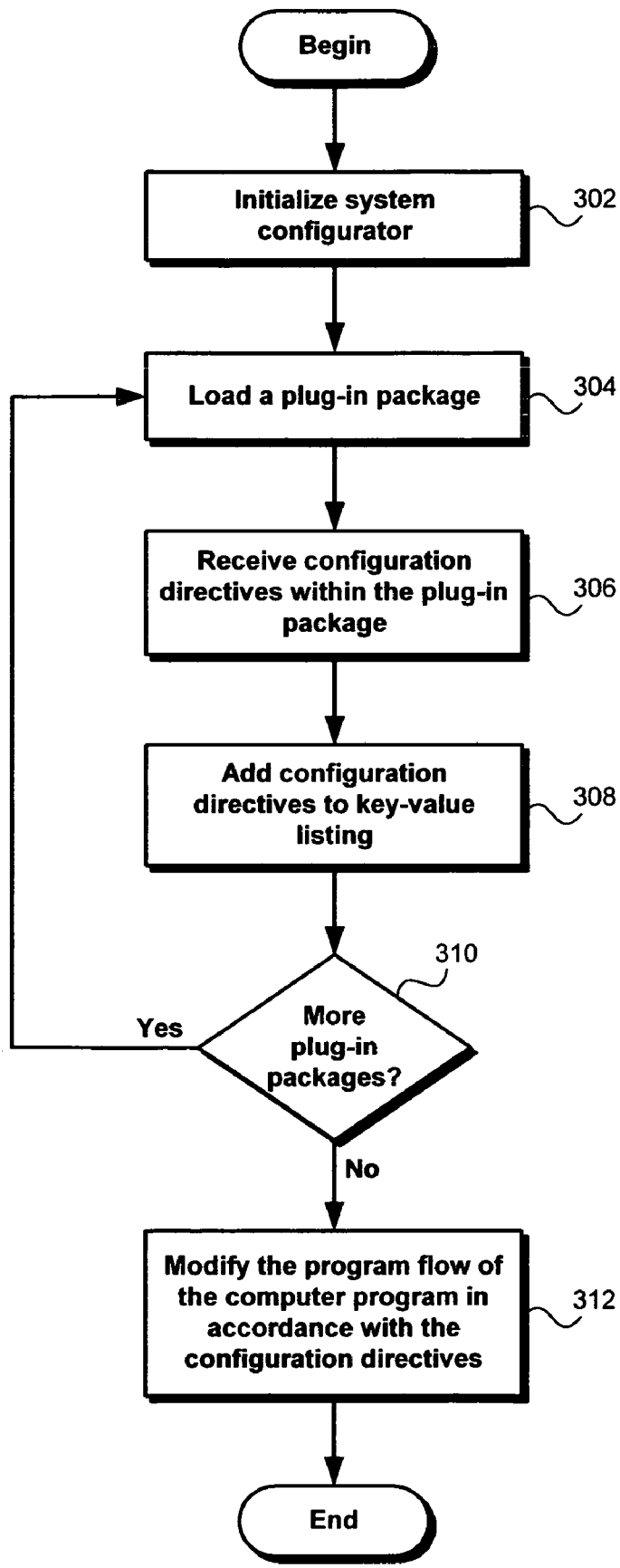
FIG. 3 shows a flowchart of the program flow of one embodiment of the present invention.

Turning now to FIG. 3, a flowchart illustrates the program flow of one embodiment of a system configurator. It should be remarked that the logical operations shown may be implemented (1) as a sequence of computer executed steps running on a computing system and/or (2) as interconnected machine modules within the computing system. Furthermore, the operations may be performed on a virtual machine abstracted in a computer platform, such as the Java Virtual Machine (JVM) executing over a native operating system. The implementation is a matter of choice dependent on the performance requirements of the system implementing the invention. Accordingly, the logical operations making up the embodiments of the present invention described herein are referred to alternatively as operations, steps, or modules.

Operational flow begins with initialization operation 302. The initialization operation 302 prepares the system configurator for processing plug-in packages. This operation 302 may entail allocating memory, initializing variables and opening file streams. It is contemplated that the exact operations carried out in initializing operation 302 is dependent of the specific program employing the system configurator. After initialization operation 302 is completed, control passes to loading operation 304.

At loading operation 304, the system configurator searches for and loads a program plug-in that modifies the functionality of the underlying computer program in accordance with the configurator's specifications. For example, the plug-in may include a plug-in manifest file that includes an extension definition for an extension point of the system configurator. Furthermore, the extension definition may indicate a configuration file within the plug-in package containing directives for modifying the functionality of the underlying computer program. Thus, using the plug-in manifest, the configurator can determine which plug-ins require modification to the underlying program's functionality. Upon completion of loading operation 304, control passes to receiving operation 306.

At receiving operation 306, the system configurator receives configuration directives within the plug-in package for modifying the underlying program's functionality. As mentioned earlier, the configuration directives may be stored in the plug-in package under analysis. In a particular embodiment of the invention the plug-in manifest provides the exact location of a configuration file holding the configuration directives. The system configurator opens a file stream to the configuration file and retrieves the configuration directives.

As discussed above, a configuration directive may be simple expressions substituting one code identifier for another code identifier. Such an expression may be, for example, com.ibm.commerce.telesales.logonDialog=com.mycompany.logonDialog. Alternatively, a configuration directive may indicate removal of program functionality by equating a code identifier with NULL or similar value. It should be stated that a configuration file may include more than configuration directive.

Next, at adding operation 308, the system configurator converts the configuration directive to a key-value pair and adds this pair to a key-value list. In a particular embodiment of the invention, the system configurator utilizes the java.util.Properties API to generate the key-value list. The key-value list may be maintained in random access memory, as discussed above. After adding operation 308 is completed, control follows to determining operation 310.

At determining operation 310, the system configurator queries if additional plug-in packages at modify the underlying program's functionality remain to be processed. If, so control returns to loading operation 304, where the step described above are repeated. After the last plug-in has been processed by the configurator, control passes to modifying operation 312.

At modifying operation 312, the system configurator modifies the program flow of the underlying computer program in accordance with the processed configuration directives. During modifying operation 312, the system configurator queries the key-value data structure 113 and directs the underlying program to the appropriate extension point of the processed plug-in packages. After modifying operation 312 is completed, the process ends.

Figure 4:
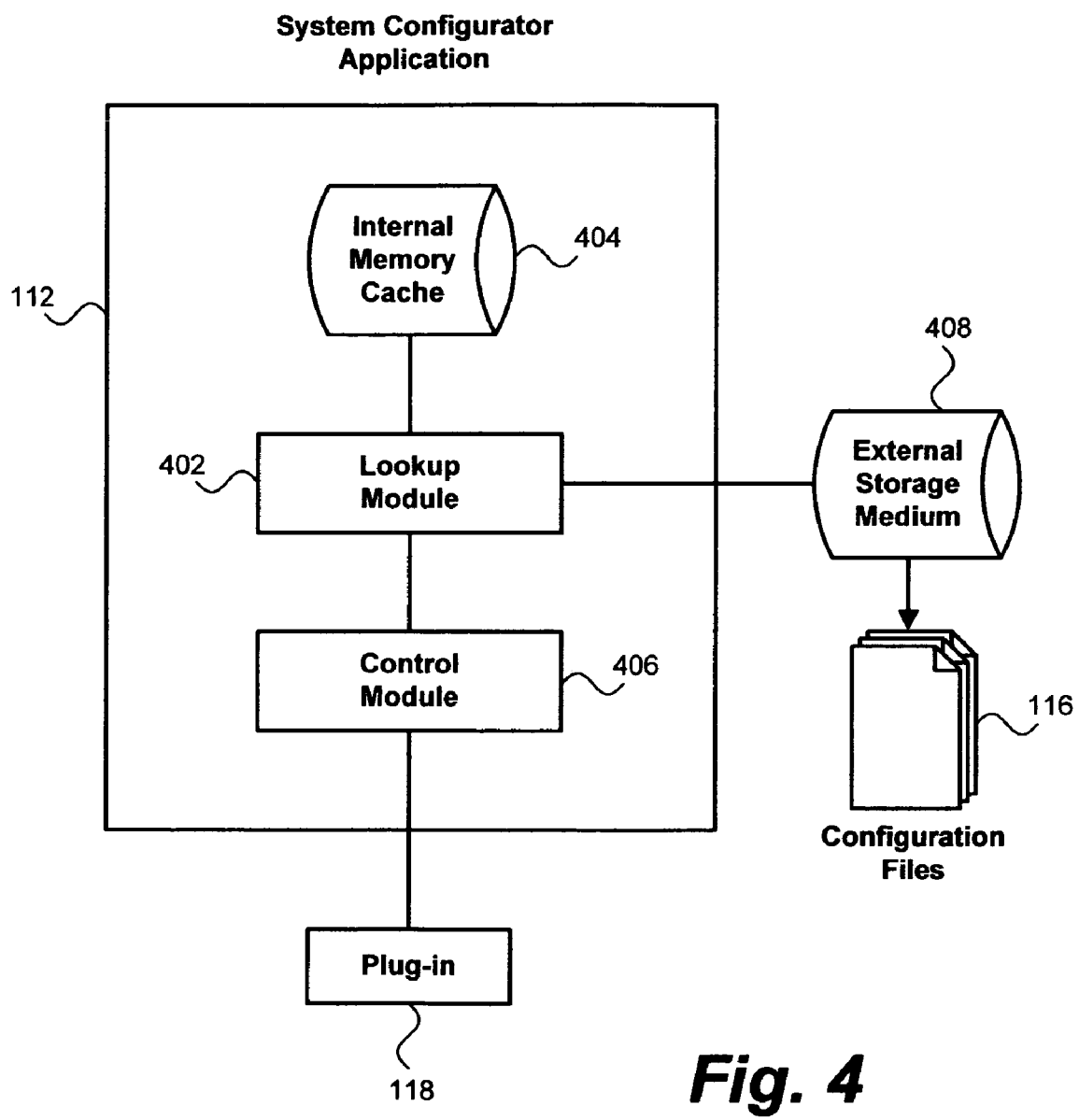
FIG. 4 shows a system configurator application for replacing and removing plug-ins in hierarchically extensible computer environments as contemplated by one embodiment of the present invention.

Turning now to FIG. 4, an exemplary system configurator application 112 for associating plug-ins with appropriate extensions, as contemplated by one embodiment of the present invention, is shown. The system configurator application 112 may be embodied in various tangible media known in the art, including, but not limited to, read only memory, random access memory, optical and magnetic memory, and the like.

The system configurator application 112 includes a lookup module 402, an internal cache 404 and a control module 406. The lookup module 402 is configured to recursively search for configuration files 116 within plug-in packages. The configuration files 116, as discussed above, include configuration directives for removing and/or replacing computer executable codes. In addition, the configuration directives include code identifiers pointing to the computer executable codes for execution by the underlying computer program.

The lookup module 402 is further responsible for the actual association of plug-ins to extensions. Upon initialization, the system configurator application 112 searches a storage medium 408, which is external to the application, to find all the relevant configuration files 116. It processes these files into an internal format, a key-value data structure 113, which is stored in an internal cache 404. The internal cache may be implemented in random access memory, data streams, optical and magnetic memory or any other form of memory to which new data may be written. The procedure by which the files are processed and the format of the data structure are as discussed above. During runtime, the lookup module 402 is capable of accessing the data stored in the internal cache 404. It incorporates all business logic necessary to determine the appropriate plug-in to use.

The system configurator application 112 also includes a control module 406. The control module 406 is configured to modify the program flow of the computer program in accordance with the configuration directives. The control module 406 further provides a means for external plug-ins to query for the appropriate extension. It is contemplated that this means can be provided via a function call. The unique identifier of the extension is passed to the control module via an argument to the function call. In an alternative embodiment of the present application, the interface may be provided as a direct, hardware-based connection to a version of the application implemented in hardware.

A plug-in 118 which wishes to determine the appropriate extension to use passes the unique identifier of that extension to the control module 406. The control module 406 accepts the external function call. In turn, it queries the lookup module 402 for the unique identifier. The lookup module 402 determines the unique identifier of the appropriate plug-in and returns it to the control module 406. The control module 406 returns the unique identifier of the appropriate extension to the external plug-in 118.

The foregoing description of the invention has been presented for purposes of illustration and description. It is not intended to be exhaustive or to limit the invention to the precise form disclosed, and other modifications and variations may be possible in light of the above teachings. As discussed above, although the techniques discussed herein were made with specific reference to Eclipse, it is contemplated that similar techniques may be utilized in various other computer programs.

The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for modifying functionality of an installed computer program, the method comprising:

receiving a first plug-in package, the first plug-in package including a first code identifier, the first code identifier pointing to a first computer executable code provided in said first plug-in package for modifying functionality of the installed computer program; and receiving a second plug-in package, the second plug-in package including a configuration directive for at least one of removing and replacing the first computer executable code, the configuration directive including the first code identifier; and modifying program flow of the computer program in accordance with the configuration directive.

2. The method of claim 1, further comprising:

replacing the first computer executable code with a second computer executable code for execution by the computer program; and wherein the configuration directive includes a second code identifier, the second code identifier pointing to the second computer executable code.

3. The method of claim 1, further comprising:

removing the first computer executable code; and wherein the configuration directive includes a null value.

4. The method of claim 1, further comprising creating a key-value entry in a key-value listing, the key-value entry including the first code identifier.

5. The method of claim 1, further comprising loading the configuration directive from a file within the second plug-in package.

6. A system for modifying functionality of a computer program, the system comprising:

a processor configured to execute said computer program;

wherein said processor is configured to execute code that causes said processor to implement:

a lookup module configured to recursively search for configuration files within plug-in packages, the configuration files including configuration directives for at least one of removing and replacing computer executable codes provided within the plug-in packages; and a control module configured to modify program flow of the computer program in accordance with the configuration directives and a hierarchy of the plug-in packages;

wherein the configuration directives include code identifiers pointing to the computer executable codes for execution by the computer program.

7. The system of claim 6, wherein the control module is further configured to replace a first code identifier with a second code identifier.

8. The system of claim 6, wherein the control module is further configured to replace a first code identifier with a null value.

9. The system of claim 6, wherein the lookup module is further configured to populate a key-value data structure, the key-value data structure including the code identifiers.

10. A computer program product embodied in a computer memory comprising: computer readable program codes coupled to the computer memory for modifying functionality of an installed computer application, the computer readable program codes configured to cause the program to: receive a first plug-in package, the first plug-in package including a first code identifier, the first code identifier pointing to a first computer executable code provided in said first plug-in package for modifying functionality of the installed computer application; receive a second plug-in package, the second plug-in package including a configuration directive for at least one of removing and replacing the first computer executable code, the configuration directive including the first code identifier; and modify program flow of the computer application in accordance with the configuration directive.

11. The computer program product of claim 10, further comprising:
   program codes configured to cause the program to replace the first computer executable code with a second computer executable code for execution by the computer application; and
   wherein the configuration directive includes a second code identifier, the second code identifier pointing to the second computer executable code.

12. The computer program product of claim 10, further comprising:
   program codes configured to cause the program to remove the first computer executable code; and
   wherein the configuration directive includes a null value.

13. The computer program product of claim 10, further comprising program codes configured to cause the program to create a key-value entry in a key-value listing, the key-value entry including the first code identifier.

14. The computer program product of claim 10, further comprising program codes configured to cause the program to load the configuration directive from a file within the second plug-in package.

* * * * *